(12) United States Patent (10) Patent No.: US 8,144,957 B2
Qu et al. (45) Date of Patent: Mar. 27, 2012

(54) MEDICAL IMAGE DATA PROCESSING AND FEATURE IDENTIFICATION SYSTEM

(75) Inventors: Wei Qu, Schaumberg, IL (US); Yuanyuan Jia, Chicago, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 569 days.

(21) Appl. No.: 12/325,724

(22) Filed: Dec. 1, 2008

(65) Prior Publication Data

US 2009/0190813 A1 Jul. 30, 2009

Related U.S. Application Data

(60) Provisional application No. 61/024,619, filed on Jan. 30, 2008.

(51) Int. Cl.
*G06K 9/00* (2006.01)
(52) U.S. Cl. ........................................ 382/128; 382/132
(58) Field of Classification Search ........................ None
See application file for complete search history.

(56) References Cited

OTHER PUBLICATIONS

Michael Kass, Andrew Witkin, and Demetri Terzopoulos, "Snakes: Active contour models," International Journal of Computer Vision 1, pp. 321-331, 1987, Boston.
Jianbo Shi and Jitendra Malik, "Normalized cuts and image segmentation," IEEE Transactions on Pattern Analysis and Machine Intelligence 22(8), pp. 888-905, Aug. 2000.
Yuri Boykov, Olga Veksler, and Ramin Zabih, "Fast approximate energy minimization via graph cuts," IEEE Transactions on Pattern Analysis and Machine Intelligence 23(11), pp. 1222-1239, 2001.
Ning Xu, Ravi Bansal, and Narendra Ahuja, "Object segmentation using graph cuts based active contours," in Proc. of IEEE International Conference on Computer Vision and Pattern Recognition, 2003.
T. F. Cootes, C. J. Taylor, D. H. Cooper, and J. Graham, "Active shape models—their training and application," Computer Vision and Image Understanding 61(1), pp. 38-59, Jan. 1995.
Xiaolei Huang, Nikos Paragios, and Dimitris Metaxas, "Shape registration in implicit spaces using information theory and free form deformations," IEEE Transactions on Pattern Analysis and Machine Intelligence 28(8), pp. 1303-1318, 2006.
Xiaolei Huang, Nikos Paragios, and Dimitris Metaxas, "Establishing local correspondences towards compact representations of anatomical structures," in International Conf. on Medical Image Computing and Computer Assisted Intervention, (926-934), 2003.
Simon Maskell and Neil Gordon, "A tutorial on particle filters for online nonlinear/non-Gaussian Baysian tracking," IEEE Trans. Signal Processing 50, pp. 174-188, Feb. 2002.
Wei Qu, Dan Schonfeld, and Magdi Mohamed, "Real-time interactively distributed multi-object tracking using a magneticinertia potential model," IEEE Transactions on Multimedia 9(3), pp. 511-519, 2007.

*Primary Examiner* — Roberto Velez
(74) *Attorney, Agent, or Firm* — Alexander J Burke

(57) ABSTRACT

An anatomical feature boundary identification system for use in processing medical images including X-ray images having a substantial noise content, employs at least one repository. The at least one repository stores data representing multiple different candidate template boundary shapes for individual particular anatomical features of multiple different types of anatomical features. A computation processor coupled to the at least one repository, determines a converged boundary shape of a particular anatomical feature by iteratively substantially minimizing a first difference between, data representing a weighted combination of multiple different candidate template boundary shapes of a particular anatomical feature and data representing a boundary shape of the particular anatomical feature derived from image data of the particular anatomical feature. The computation processor iteratively substantially maximizes a second difference between, data representing the weighted combination and data representing background non-anatomical features in an image. An output processor coupled to the computation processor, provides data representing the converged boundary shape of the particular anatomical feature for presentation in a display image of the particular anatomical feature.

15 Claims, 4 Drawing Sheets

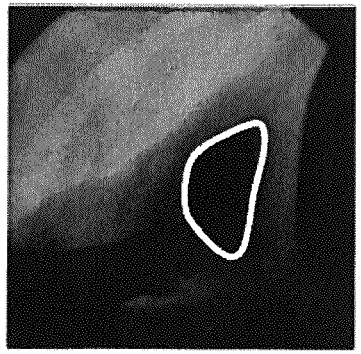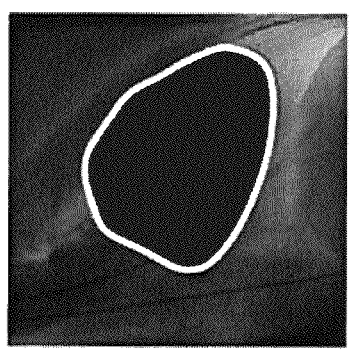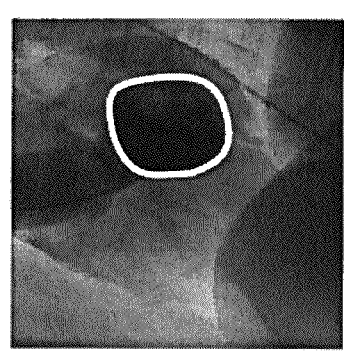
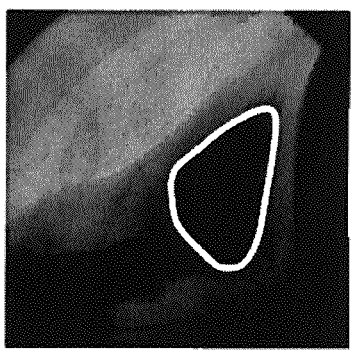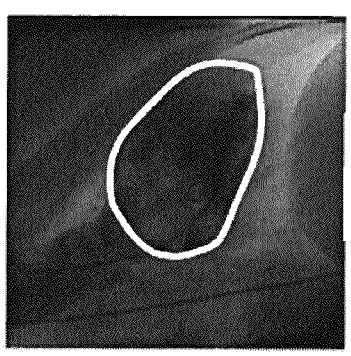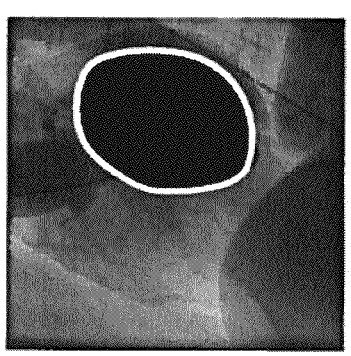
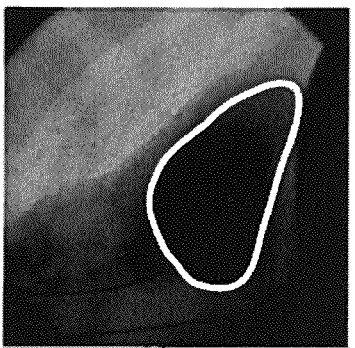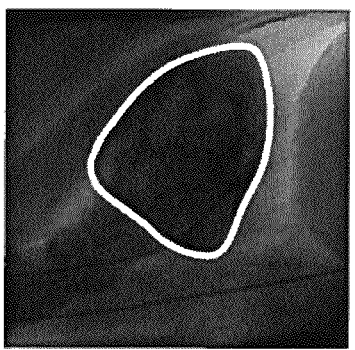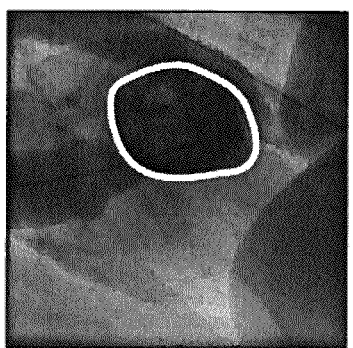
FIGURE 4A  FIGURE 4B  FIGURE 4C

MEDICAL IMAGE DATA PROCESSING AND FEATURE IDENTIFICATION SYSTEM

This is a non-provisional application of provisional application Ser. No. 61/024,619 filed Jan. 30, 2008, by W. Qu et al.

FIELD OF THE INVENTION

This invention concerns a boundary identification system for use in processing medical images including X-ray (as well MR, CT scan and Ultrasound images) having a substantial noise content, to identify an anatomical feature, for example.

BACKGROUND OF THE INVENTION

Some imaging modality systems such as X-ray, MR, CT scan and Ultrasound systems produce noisy images under some conditions that render identification of anatomical features and their boundaries (a process termed segmentation) difficult. Specifically, X-ray angiographic left ventricular image acquisition and analysis using cardiac image segmentation, is often difficult because of image noise derived from heart movement, patient movement, environmental effects and X-ray imaging artifacts, for example. In this application, imaging conditions typically cannot be optimized for individual image frames. However, images are processed notwithstanding image clutter and noise including environmental effects such as low contrast and non-uniform illumination, fadeout, glare, and loss of focus, for example.

Known common medical image segmentation functions typically fail to adequately identify anatomical features in the presence of image noise. FIGS. 1A and 1B illustrate image Segmentation to identify an anatomical feature using known different processes including, a first (graph cut) process providing curves 104 and a second (snake) process providing curves 107. The known processes fail to correctly identify the anatomical feature boundary in the noisy X-ray images of FIGS. 1A and 1B. The second (snake) process providing curves 107 suffers from a known local minimal problem and fails to correctly identify the anatomical feature boundary and the first (graph cut) process providing curves 104 fails to identify the boundary in the X-ray images because of low contrast. Further, use of Active Shape Models (ASMs) which are statistical models learned from examples to capture shape variations in an object, may perform more robustly in image interpretation. However, a boundary finding process employed by ASMs is deterministic, requiring a model to be initialized sufficiently close to the object to converge and may be prone to error due to local minima. Other known image feature boundary identification systems exhibit difficulty in processing noisy image data. A system according to invention principles addresses these deficiencies and related problems.

SUMMARY OF THE INVENTION

A system identifies an anatomical feature boundary in a noisy medical image using predetermined clinical knowledge of an object shape. An anatomical feature boundary identification system for use in processing medical images including X-ray images having a substantial noise content, employs at least one repository. The at least one repository stores data representing multiple different candidate template boundary shapes for individual particular anatomical features of multiple different types of anatomical features. A computation processor coupled to the at least one repository, determines a converged boundary shape of a particular anatomical feature by iteratively substantially minimizing a first difference between, data representing a weighted combination of multiple different candidate template boundary shapes of a particular anatomical feature and data representing a boundary shape of the particular anatomical feature derived from image data of the particular anatomical feature. The computation processor iteratively substantially maximizes a second difference between, data representing the weighted combination and data representing background non-anatomical features in an image. An output processor coupled to the computation processor, provides data representing the converged boundary shape of the particular anatomical feature for presentation in a display image of the particular anatomical feature.

BRIEF DESCRIPTION OF THE DRAWING

FIGS. 4A, 4B and 4C illustrate medical image anatomical feature boundary identification results produced by the system for X-ray left ventricular angiography images.

DETAILED DESCRIPTION OF THE INVENTION

Figures 1A, 1B:
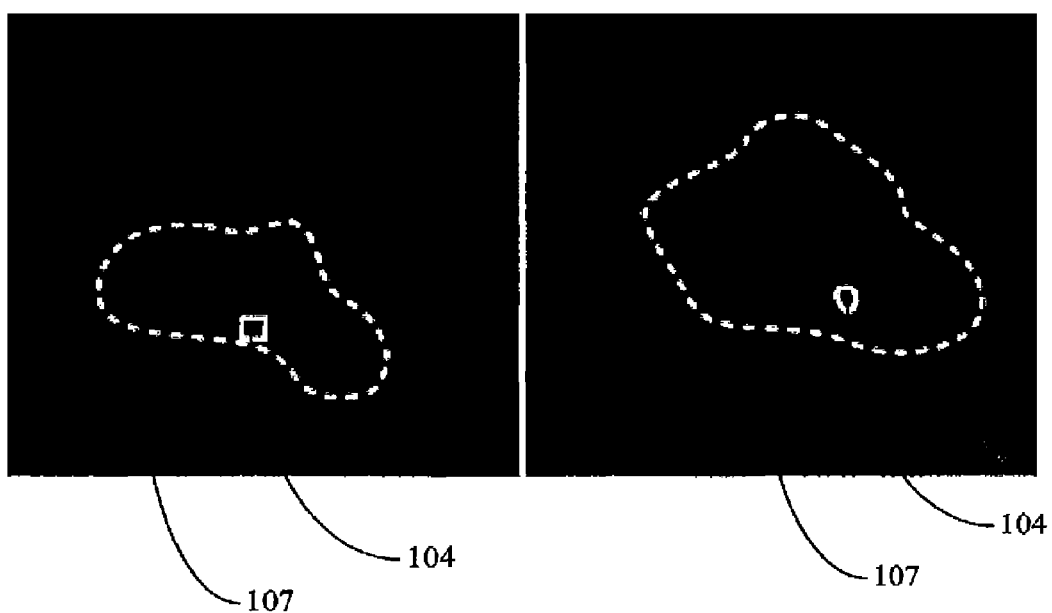
FIGS. 1A and 1B illustrate image Segmentation to identify an anatomical feature using known different processes including a first (graph cut) process and a second (snake) process.

A system identifies an anatomical feature boundary in a noisy medical image such as an X-ray image using predetermined clinical knowledge of an object shape to provide relatively reliable and rapid boundary identification (segmentation). In one embodiment the system identifies an anatomical feature boundary in a noisy medical image such as an X-ray angiography image using Principle Component Analysis (PCA) based particle filtering and an associate PCA model and predetermined clinical knowledge of the shape of an object shape. Particle filters are used to produce candidate shape data, evaluate the likelihood of an anatomical feature having a candidate shape given observed image data and estimate the object shape by weighted combination of multiple candidate shapes (particles). The system employs an iterative boundary identification process that provides improved effectiveness in identifying a global optimum boundary for an image anatomical feature. The system results demonstrate improved effectiveness and efficiency on both synthetic (non-real test) data and real clinical data.

A processor as used herein is a device for executing stored machine-readable instructions for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a controller or microprocessor, for example. A processor may be electrically coupled with any other processor enabling interaction and/or communication there-between. A processor comprising executable instructions may be electrically coupled by being within stored executable instruction enabling interaction and/or communication with executable instructions comprising another processor. A user interface processor or generator is a known element comprising electronic circuitry or software or a combination of both for generating display images or portions thereof. A user interface comprises one or more display images enabling user interaction with a processor or other device.

An executable application comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a user interface processor and enabling user interaction with a processor or other device and associated data acquisition and processing functions.

The UI also includes an executable procedure or executable application. The executable procedure or executable application conditions the user interface processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity. A template boundary shape is a predetermined shape of an anatomical feature and a candidate template boundary shape is a predetermined shape available for selection.

Figure 2B:
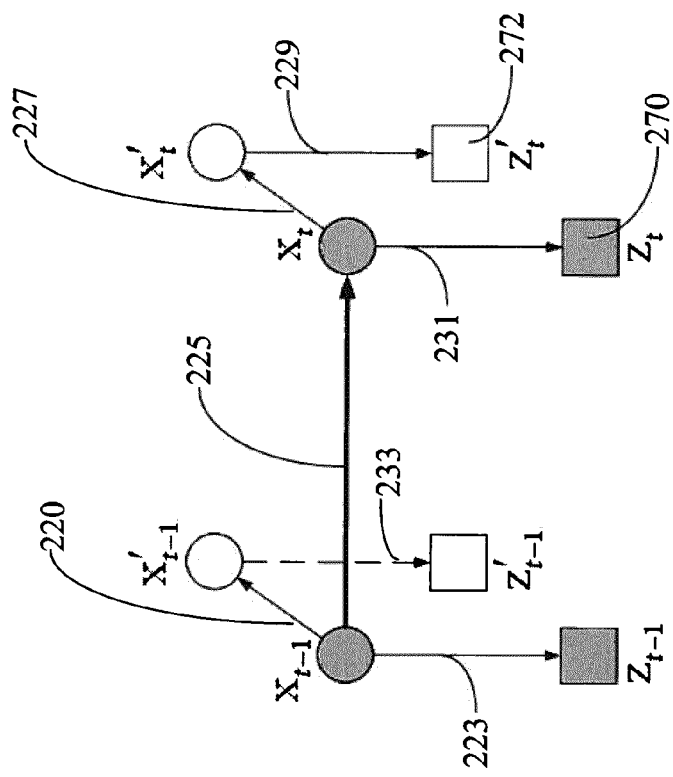
FIGS. 2A and 2B show a Static graphical model and a Dynamic graphical model of a medical image anatomical feature boundary identification system, respectively, according to invention principles.
Figure 2A:
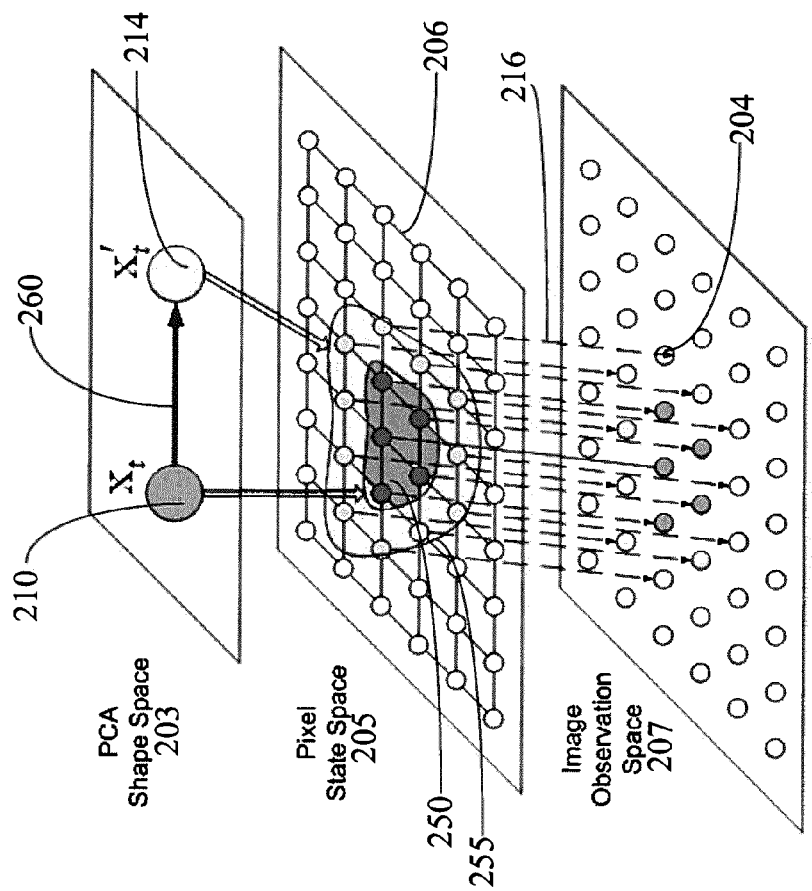

FIGS. 2A and 2B show a Static graphical model and a Dynamic graphical model, respectively, used in image data analysis for anatomical feature boundary identification. In the static graphical model of FIG. 2A, layer 203 comprises Principle Component Analysis (PCA) shape space, layer 205 comprises pixel state space and layer 207 comprises image observation space. Layer 207 represents an observed medical image and individual circle nodes (e.g., 204) represent individual image pixels. It is assumed that the observed pixels are independent, so there are no links shown between nodes. Layer 205 represents the state of individual pixels in the image data of layer 207. The links (e.g., link 206) between individual nodes represents correlation between nodes. The links (e.g., link 216) between nodes in image observation space layer 207 and the nodes in pixel state space layer 205 represent a generative relationship. Shaded region 250 in pixel state space layer 205 represents a target object for boundary identification. In order to find a region to represent the background information and thus make boundary identification more stable, the system selects a shaded belt region 255 having a predetermined width around the target object. A Principle Component Analysis (PCA) shape space layer 203 is also used and includes two nodes $x_t$ 210 and $x'_t$ 214 that represent principle component vectors for target object region 250 and background belt region 255, respectively. This decreases the number of dimensions needed in computation. Link 260 between $x_t$ and $x'_t$ represents their correlation.

The system iteratively derives a target object boundary and in the dynamic graphical model of FIG. 2B, t is the iteration index, $z_t$ 270 and $z'_t$ 272 represent pixel sets in image observation space for target object region 250 and background belt region 255, respectively. The image observation space layer 207 is simplified based on graphical theory since a link from PCA shape space layer 203 to pixel state space layer 205 has the same direction as a link from pixel state space layer 205 to image observation space layer 207. Links 220 and 227 represent an object-background relation density. Link 225 represents state dynamic characteristics. Directional links 223 and 231 represent object observation likelihood. Directional links 233 and 229 represent a background observation likelihood.

Particle filtering theory is employed in anatomical feature boundary identification and in estimation of a posterior density based on image observation data and the background belt region 255. Bayes rule is used to derive an updating rule for the dynamic graphical model such as the model illustrated in FIG. 2B $$p(x_{1:t} \mid x'_{1:t}, z_{1:t}, z'_{1:t}) = \frac{p(x_t, x'_t, z_t, z'_t \mid x_{1:t-1}, x'_{1:t-1}, z_{1:t-1}, z'_{1:t-1})}{p(x'_t, z_t, z'_t \mid x'_{1:t-1}, z_{1:t-1}, z'_{1:t-1})} \quad (1)$$

$$p(x_{1:t-1} \mid x'_{1:t-1}, z_{1:t-1}, z'_{1:t-1})$$

$$= \frac{p(z_t, z'_t \mid x_t, x'_t, x_{1:t-1}, x'_{1:t-1}, z_{1:t-1}, z'_{1:t-1}) p(x_t, x'_t \mid x_{1:t-1}, x'_{1:t-1}, z_{1:t-1}, z'_{1:t-1})}{p(x'_t, z_t, z'_t \mid x'_{1:t-1}, z_{1:t-1}, z'_{1:t-1})} \quad (2)$$

$$p(x_{1:t-1} \mid x'_{1:t-1}, z_{1:t-1}, z'_{1:t-1})$$

$$= \frac{p(z_t, z'_t \mid x_t, x'_t) p(x_t, x'_t \mid x_{t-1})}{p(x'_t, z_t, z'_t \mid x'_{1:t-1}, z_{1:t-1}, z_{1:t-1})} \quad (3)$$

$$p(x_{1:t-1} \mid x'_{1:t-1}, z_{1:t-1}, z'_{1:t-1})$$

$$= \frac{p(z_t \mid z'_t, x_t, x'_t) p(z'_t \mid x_t, x'_t) p(x'_t \mid x_t, x_{t-1}) p(x_t \mid x_{t-1})}{p(x'_t, z_t, z'_t \mid x'_{1:t-1}, z_{1:t-1}, z'_{1:t-1})} \quad (4)$$

$$= \frac{p(z_t \mid x_t) p(z'_t \mid x'_t) p(x'_t \mid x_t) p(x_t \mid x_{t-1})}{p(x'_t, z_t, z'_t \mid x'_{1:t-1}, z_{1:t-1}, z'_{1:t-1})} \quad (5)$$

$$p(x_{1:t-1} \mid x'_{1:t-1}, z_{1:t-1}, z'_{1:t-1})$$

In equation (2), conditional independence properties from the graphical model are used $$p(z_t, z'_t \mid x_t, x'_t, x_{1:t-1}, x'_{1:t-1}, z_{1:t-1}, z'_{1:t-1}) = p(z_t, z'_t \mid x_t, x'_t), \text{ and,}$$

$$p(x_t, x'_t \mid x_{1:t-1}, x'_{1:t-1}, z_{1:t-1}, z'_{1:t-1}) = p(x_t, x'_t \mid x_{t-1})$$

In equation (5), the applied properties are $p(z_t \mid z'_t, x_t, x'_t) = p(z_t \mid x_t)$, and $p(z'_t \mid x_t, x'_t) = (z'_t \mid x'_t)$. Based on particle filtering theory, the posterior density $p(x_{1:t} \mid x'_{1:t}, z_{1:t}, z'_{1:t})$ is approximated as $$p(x_{1:t} \mid x'_{1:t}, z_{1:t}, z'_{1:t}) \approx \sum_{n=1}^{N} \omega_t^n \delta(x_{1:t} - x_{1:t}^n) \quad (6)$$

where $\{x_{1:t}^n, n=1 \ldots N\}$ is a set of samples, $\{\omega_{1:t}^n, n=1 \ldots N\}$ are the associated weights, and $\delta$ is the Dirac delta function. Based on importance sampling theory, the weights are given by $$\omega_t^n \propto p(z_t \mid x_t) p(z'_t \mid x'_t) p(x'_t \mid x_t) \omega_{t-1}^n. \quad (7)$$

In equation (7), $p(z_t \mid x_t)$ and $p(z'_t \mid x'_t)$ are object observation likelihood and background observation likelihood, respectively, which are estimated using image observation data. Further, a kernel-based histogram is used to weight the samples. The local likelihood density is estimated as follows:

$$p(z_t | x_t^n) = \frac{1}{2\pi\sigma_1} \exp\left\{-\frac{\{h(z_t | x_t^n) - h_0\}^2}{\sigma_1^2}\right\} \quad (8)$$

where $h_0$ is a prior histogram model of the target object, $h(z_t|x_t^n)$ is the histogram of sample $x_t^n$.

Similarly, the background likelihood density is, $$p(z'_t | x_t'^m) = \frac{1}{2\pi\sigma_2} \exp\left\{-\frac{\{h(z'_t | x_t'^m) - h'_0\}^2}{\sigma_2^2}\right\} \quad (8)$$

where $h'_0$ is a prior background histogram model, $p(x'_t|x_t)$ is termed "object-background-belt relation density". Background belt region 255 is selected to have a predetermined fixed width determined based on a Gaussian distribution. When the posterior density is iteratively estimated, its expectation is calculated to give a final estimated object shape.

Figure 3:
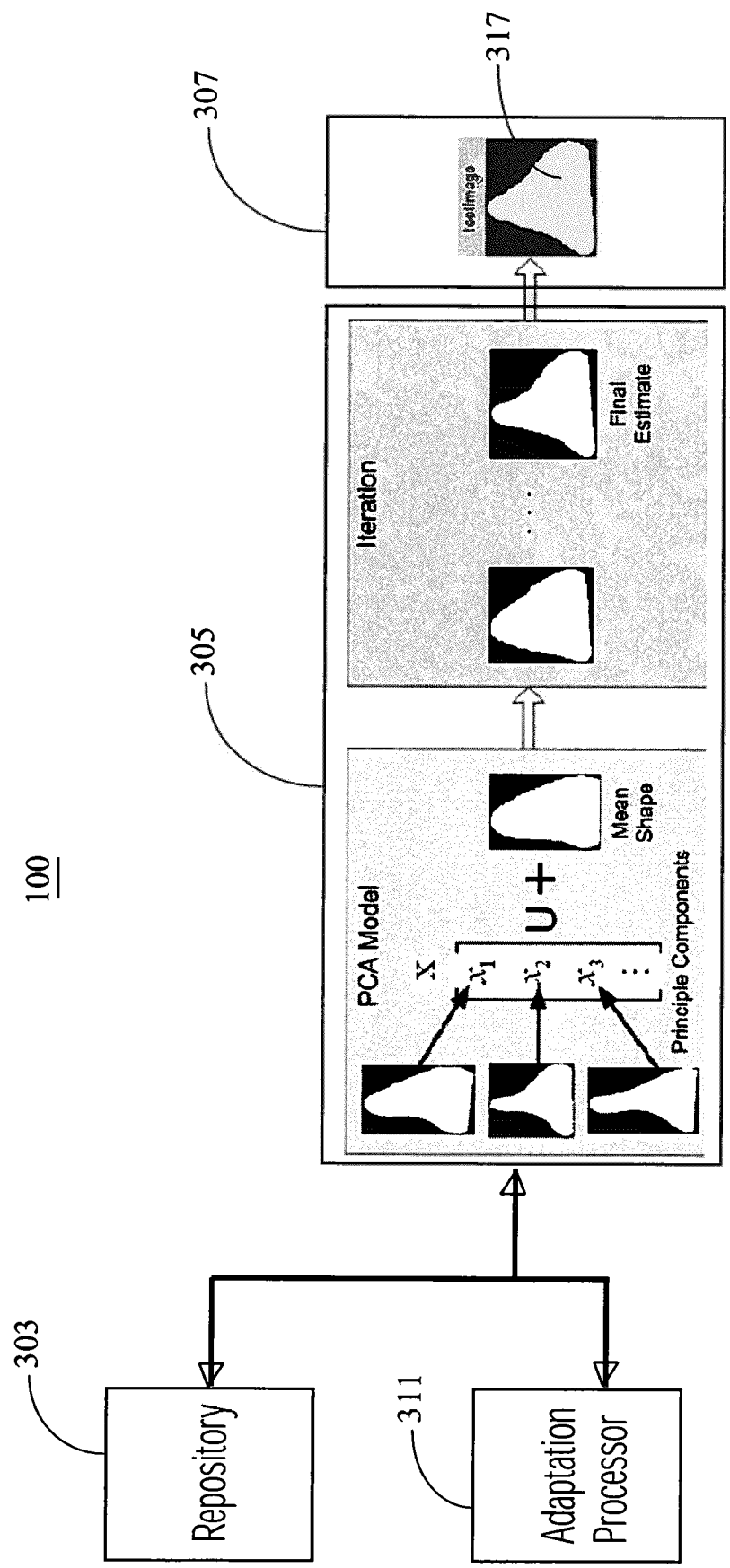
FIG. 3 shows a medical image anatomical feature boundary identification system, according to invention principles.

FIG. 3 shows medical image anatomical feature boundary identification system 100 for use in processing medical images including X-ray images having a substantial noise content. At least one repository 303 stores data representing multiple different candidate template boundary shapes for individual particular anatomical features of multiple different types of anatomical features. The multiple different types of anatomical features comprise tumors and different anatomical organs including at least two of, (a) a heart, (b) a lung, (c) a liver, (d) a kidney. Computation processor 305 coupled to at least one repository 303, determines a converged boundary shape of a particular anatomical feature by iteratively substantially minimizing a first difference between, data representing a weighted combination of multiple different candidate template boundary shapes of a particular anatomical feature and data representing a boundary shape of the particular anatomical feature derived from image data of the particular anatomical feature, by applying a weighted combination of vectors individually representing individual shapes of the multiple different candidate template boundary shapes to data representing an initial shape. In one embodiment, a Principle Component Analysis (PCA) particle filter state vector includes target shape location information which advantageously allows shape change as well as position change for candidate shapes. The data representing the initial shape is derived by taking an average of multiple different candidate template boundary shapes. Computation processor 305 iteratively substantially maximizes a second difference between, data representing the weighted combination and data representing background non-anatomical features in an image.

Computation processor 305 determines the converged boundary shape by iteratively applying a probability density function in substantially minimizing the first difference and substantially maximizing the second difference. Computation processor 305 determines the converged boundary shape by iteratively applying a probability density function of the form, $$p(z_t|x_t)p(z'_t|x'_t)p(x'_t|x_t),$$

where $p(z_t|x_t)$ and $p(z'_t|x'_t)$ are object observation likelihood and background observation likelihood, respectively, which can be estimated by the image observation data, $p(x'_t|x_t)$ is an "object-background relation density".

In one embodiment, computation processor 305 iteratively minimizes the difference by applying a weighted combination of vectors individually representing individual shapes of the multiple different candidate template boundary shapes to data representing an average shape derived by taking an average of multiple different candidate template boundary shapes. The average of the multiple different candidate template boundary shapes is an arithmetic mean of the multiple different candidate template boundary shapes. Further, the different candidate template boundary shapes of the particular anatomical feature are multiple different averaged candidate template boundary shapes of the particular anatomical feature derived by taking an average of subsets of the multiple different candidate template boundary shapes of the particular anatomical feature.

Output processor 307 coupled to computation processor 305, provides data representing the converged boundary shape of the particular anatomical feature for presentation in display image 317 of the particular anatomical feature. Computation processor 305 employs an average (e.g., arithmetic mean) shape derived by taking an average of multiple different candidate template boundary shapes for initialization. In an example of operation, the converged boundary shape shown in image 317 that is similar to the candidate template boundary shapes, was obtained after forty six iterations. Adaptation processor 311 adaptively determines different candidate template boundary shapes in response to at least one of, (a) predetermined user preference information and (b) frequency of usage of individual template boundary shapes of the different candidate template boundary shapes. Adaptation processor 311 adaptively determines the different candidate template boundary shapes in response to substantially immediate feedback updating the frequency of usage of the individual template boundary shapes.

Computation processor 305 performs an image preprocessing step to identify the approximate center of an initial shape boundary identification system 100 for use in processing X-ray angiography images having a substantial noise content. The particle filter's state vector was also extended to include object location information. This achieves more robust segmentation, which allows shape change and position change for samples.

FIGS. 4A, 4B and 4C individually comprise rows of three images each which illustrate medical image anatomical feature boundary identification results produced by system 100 (FIG. 3) for X-ray left ventricular angiography images. FIGS. 4A, 4B and 4C illustrate improved boundary identification compared with known systems such as the known system results of FIGS. 1A and 1B. System 100 achieves improved boundary identification results in the presence of substantial background noise, clutter, shadow, and unevenly distributed contrast in an X-ray left ventricular image, for example. System 100 advantageously uses predetermined shape information inherent in a trained PCA model and avoids the leakage problem occurring with known graph cut processing of noisy medical image data. In an example of operation, system 100 uses a PCA model for the left ventricle in identifying a feature in X-ray angiographic images. The model is trained using candidate template boundary shapes manually selected from thousands of medical images and using 4-7 principle components, for example, FIG. 3 shows an example of a PCA model in which individual principle components comprise a vector representing a curve shape of a left ventricle in a 2-chamber view of an ultrasound echocardiograph, for example. System 100 identifies a boundary within 1-4 seconds using Matlab™ on a regular PC, for example.

The system and processes of FIGS. 2-4 are not exclusive. Other systems and processes may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. A PCA model is used to sample shape space, evaluate the likelihood that candidate shapes match an anatomical feature shape indicated in observed image data and estimate an anatomical feature shape by weighted combination of candidate shapes. Medical image anatomical feature boundary identification results produced by system 100 in real time show substantial improvement over known boundary identification systems as indicated by comparing the known system results of FIG. 1 with the system 100 results of FIG. 4. Further, the processes and applications may, in alternative embodiments, be located on one or more (e.g., distributed) processing devices. Any of the functions and steps provided in FIGS. 2-3 may be implemented in hardware, software or a combination of both.

What is claimed is:

1. An anatomical feature boundary identification system for use in processing medical images including X-ray images having a substantial noise content, comprising:
   at least one repository for storing data representing a plurality of different candidate template boundary shapes for individual particular anatomical features of a plurality of different types of anatomical features;
   a computation processor coupled to said at least one repository, for,
      determining a converged boundary shape of a particular anatomical feature by iteratively substantially minimizing a first difference between,
         data representing a weighted combination of a plurality of different candidate template boundary shapes of a particular anatomical feature and
         data representing a boundary shape of said particular anatomical feature derived from image data of said particular anatomical feature and
      iteratively substantially maximizing a second difference between,
         data representing the weighted combination and
         data representing background non-anatomical features in an image; and
   an output processor coupled to said computation processor, for providing data representing said converged boundary shape of said particular anatomical feature for presentation in a display image of said particular anatomical feature.

2. A system according to claim 1, wherein
said computation processor determines said converged boundary shape by iteratively applying a probability density function in substantially minimizing the first difference and substantially maximizing the second difference.

3. A system according to claim 2, wherein
said computation processor determines said converged boundary shape by iteratively applying a probability density function of the form, $$p(z_t|x_t)p(z'_t|x'_t)p(x'_t|x_t)$$

where $p(z_t|x_t)$ and $p(z'_t|x'_t)$ are object observation likelihood and background observation likelihood, respectively, which can be estimated by the image observation data, $p(x'_t|x_t)$ is an "object-background relation density".

4. A system according to claim 1, wherein
said plurality of different types of anatomical features comprise different anatomical organs.

5. A system according to claim 4, wherein
said different anatomical organs include at least two of, (a) a heart, (b) a lung, (c) a liver, (d) a kidney.

6. A system according to claim 1, wherein
said plurality of different types of anatomical features comprise tumors.

7. A system according to claim 1, wherein
said computation processor iteratively minimizes said difference by applying a weighted combination of vectors individually representing individual shapes of said plurality of different candidate template boundary shapes to data representing an average shape derived by taking an average of a plurality of different candidate template boundary shapes.

8. A system according to claim 7, wherein
said average of said plurality of different candidate template boundary shapes is an arithmetic mean of said plurality of different candidate template boundary shapes.

9. A system according to claim 1, wherein
said plurality of different candidate template boundary shapes of said particular anatomical feature are a plurality of different averaged candidate template boundary shapes of said particular anatomical feature derived by taking an average of subsets of said plurality of different candidate template boundary shapes of said particular anatomical feature.

10. An anatomical feature boundary identification system for use in processing medical images including X-ray images having a substantial noise content, comprising:
    at least one repository for storing data representing a plurality of different candidate template boundary shapes for individual particular anatomical features of a plurality of different types of anatomical features;
    a computation processor coupled to said at least one repository, for determining a converged boundary shape of a particular anatomical feature by iteratively substantially minimizing difference between,
       data representing a weighted combination of a plurality of different candidate template boundary shapes of a particular anatomical feature and
       data representing a boundary shape of said particular anatomical feature derived from image data of said particular anatomical feature, by applying a weighted combination of vectors individually representing individual shapes of said plurality of different candidate template boundary shapes to data representing an initial shape; and
    an output processor coupled to said computation processor, for providing data representing said converged boundary shape of said particular anatomical feature for presentation in a display image of said particular anatomical feature.

11. A system according to claim 10, wherein
said data representing said initial shape is derived by taking an average of a plurality of different candidate template boundary shapes.

12. A system according to claim 10, wherein
said computation processor determines said converged boundary shape by iteratively applying a probability density function in minimizing said difference.

13. A system according to claim 10, including
an adaptation processor for adaptively determining said different candidate template boundary shapes in response to at least one of, (a) predetermined user preference information and (b) frequency of usage of individual template boundary shapes of said different candidate template boundary shapes.

14. A system according to claim 13, wherein said adaptation processor adaptively determines said different candidate template boundary shapes in response to substantially immediate feedback updating said frequency of usage of said individual template boundary shapes.

15. An anatomical feature boundary identification system for use in processing medical images including X-ray images having a substantial noise content, comprising:
- at least one repository for storing data representing a plurality of different candidate template boundary shapes for individual particular anatomical features of a plurality of different types of anatomical features;
- a computation processor coupled to said at least one repository, for determining a converged boundary shape of a particular anatomical feature by iteratively substantially minimizing difference between,
  - data representing a weighted combination of a plurality of different candidate template boundary shapes of a particular anatomical feature and
  - data representing a boundary shape of said particular anatomical feature derived from image data of said particular anatomical feature, by iteratively applying a probability density function in minimizing said difference; and
- an output processor coupled to said computation processor, for providing data representing said converged boundary shape of said particular anatomical feature for presentation in a display image of said particular anatomical feature.

* * * * *